(12) United States Patent
Hänel (10) Patent No.: US 12,488,089 B2
(45) Date of Patent: Dec. 2, 2025

(54) TRUSTED EXECUTION ENVIRONMENT SIDE-CHANNEL PROTECTION METHOD

(71) Applicant: Trustonic Limited, Cambridge (GB)

(72) Inventor: Lukas Hänel, Valbonne (FR)

(73) Assignee: Trustonic Limited, Cambridge (GB)

( * ) Notice: Subject to any disclaimer, the term of this patent is extended or adjusted under 35 U.S.C. 154(b) by 362 days.

(21) Appl. No.: 18/103,563

(22) Filed: Jan. 31, 2023

(65) Prior Publication Data

US 2023/0244781 A1  Aug. 3, 2023

(30) Foreign Application Priority Data

Feb. 1, 2022  (GB) ...................................... 2201267

(51) Int. Cl.
*G06F 21/00* (2013.01)
*G06F 9/50* (2006.01)
*G06F 21/53* (2013.01)
*G06F 21/60* (2013.01)

(52) U.S. Cl.
CPC ............ *G06F 21/53* (2013.01); *G06F 9/5066* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 9,177,153 | B1* | 11/2015 | Perrig | G06F 21/57 |
| 9,824,225 | B1* | 11/2017 | Polansky | G06F 21/75 |
| 10,372,422 | B2* | 8/2019 | Ono | G06F 8/30 |
| 10,802,885 | B2* | 10/2020 | Lee | H04L 47/125 |
| 11,392,405 | B2* | 7/2022 | Liu | G06F 21/57 |
| 12,212,568 | B1* | 1/2025 | Chandrashekar | H04L 63/10 |
| 2019/0042747 | A1* | 2/2019 | Sukhomlinov | G06F 21/6218 |
| 2019/0297084 | A1* | 9/2019 | Li | G06F 9/445 |
| 2020/0151305 | A1* | 5/2020 | Lam | G06F 8/41 |
| 2020/0226248 | A1* | 7/2020 | Shamis | G06F 21/75 |
| 2020/0366653 | A1* | 11/2020 | Caceres | H04L 63/0853 |
| 2021/0044575 | A1* | 2/2021 | Kong | H04L 9/3268 |
| 2021/0081575 | A1* | 3/2021 | Saileshwar | G06F 8/41 |
| 2021/0144170 | A1* | 5/2021 | Ganapathy | H04L 63/1475 |
| 2021/0200882 | A1* | 7/2021 | Maor | H04L 9/0897 |
| 2021/0365566 | A1* | 11/2021 | Souissi | H04L 9/0625 |
| 2022/0075901 | A1* | 3/2022 | Fanara | G06F 21/755 |
| 2022/0129542 | A1* | 4/2022 | Sun | G06F 21/53 |

(Continued)

*Primary Examiner* — Shin-Hon (Eric) Chen (74) *Attorney, Agent, or Firm* — NIXON & VANDERHYE P.C.

(57) ABSTRACT

A method for protecting a cryptographic operation on a device from a side-channel attack, the device comprising a processor operable to execute a rich execution environment (REE) and a trusted execution environment (TEE), the method comprising: receiving, at the TEE, a request to perform a cryptographic operation, wherein the cryptographic operation is divisible into a plurality of chunks; issuing, by the TEE, a command to control a characteristic of a core of the processor on which the TEE is to be executed on upon subsequent invocation of the TEE; verifying, by the TEE upon subsequent invocation of the TEE, that the characteristic of the core on which the TEE is executing on corresponds to the command; and responsive to a positive verification, performing, by the TEE, the cryptographic operation on one or more chunks of the plurality of chunks.

18 Claims, 6 Drawing Sheets

(56) References Cited

U.S. PATENT DOCUMENTS

| | | | | |
|---|---|---|---|---|
| 2022/0138286 A1* | 5/2022 | Zage | ................... | H04L 63/0428 |
| | | | | 726/26 |
| 2022/0188418 A1* | 6/2022 | Aschauer | ................ | G06F 21/76 |
| 2023/0092152 A1* | 3/2023 | Shwartz | .............. | G06F 12/1458 |
| | | | | 726/27 |
| 2024/0095362 A1* | 3/2024 | Zhang | ................... | G06F 21/575 |

* cited by examiner

S410: Issue, by the TEE to the REE, a second command to control characteristics of a core of the processor on which the TEE is to be executed on upon subsequent invocation of the TEE where the second command commands a characteristic of the core on which the TEE is to be executed on upon subsequent invocation of the TEE which are different from those commanded by the first command

TRUSTED EXECUTION ENVIRONMENT SIDE-CHANNEL PROTECTION METHOD

CROSS-REFERENCE TO RELATED APPLICATION

This application claims priority to GB 2201267.8 filed Feb. 1, 2022, the entire contents of which are hereby incorporated by reference.

FIELD AND BACKGROUND

The present techniques relate to the field of protecting a cryptographic operation on a device from a side-channel attack. More particularly, the described techniques relate to a Trusted Execution Environment (TEE) which is configured to perform the cryptographic operation, The TEE issues a command to control a characteristic of the core on which it is executing and verifies that the characteristic of the core on which the TEE is executing on corresponds to the command.

Increasingly, electronic devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it is important to ensure the security of sensitive information. The security of the sensitive information can be underpinned through the use of cryptographic operations.

One approach that has been developed in recent years is the use of Trusted Execution Environments (TEEs) which act as a secure area of a processor in which to execute sensitive applications and processes. The TEE is isolated from a Rich Execution Environment (REE) in which a rich-OS such as Android, iOS, Windows or Linux can be executed. Examples of embedded hardware technologies which can be used to support TEE implementations include Arm®'s TrustZone®, AMD's Secure Processor and Intel's Trusted Execution Technology. The cryptographic operations which underpin the security can be performed inside the TEE and hence benefit from the security provided by the TEE.

However, in recent years a number of techniques have been developed which could be used by malicious actors to extract information on the cryptographic operations being performed inside the TEE without breaching the logical security of the TEE. These techniques relying on measuring various physical parameters such as power consumption and electromagnetic emissions of the hardware implementation, for example the processor and/or SoC, that executes the TEE. A number of such attacks are described in 10.1145/3304080.3304084: Comparison of side-channel leakage on Rich and Trusted Execution Environments, dated 21 Jan. 2019 by Paul Leignac et al. The specific techniques used to perform the side-channel attacks together with the entire contents of this document are incorporated by reference.

As identified present inventors, while mitigation strategies such as applying shifting or masking to the cryptographic operations can act to increase the difficulty in a malicious actor successfully using such side-channel attack they come with a significant computational overhead.

Accordingly, as identified by the present inventors, it is desirable to provide a side-channel attack mitigation strategy that can be performed without a significant computational overhead.

At least certain embodiments of the present disclosure address one or more of these problems as set out above.

SUMMARY

Particular embodiments are set out in the independent claims. Various optional examples are set out in the dependent claims.

Viewed from one perspective, there is provided a method for protecting a cryptographic operation on a device from a side-channel attack, the device comprising a processor operable to execute a rich execution environment (REE) and a trusted execution environment (TEE), the method comprising: receiving, at the TEE, a request to perform a cryptographic operation, wherein the cryptographic operation is divisible into a plurality of chunks; issuing, by the TEE, a command to control a characteristic of a core of the processor on which the TEE is to be executed on upon subsequent invocation of the TEE; verifying, by the TEE upon subsequent invocation of the TEE, that the characteristic of the core on which the TEE is executing on corresponds to the command; and responsive to a positive verification, performing, by the TEE, the cryptographic operation on one or more chunks of the plurality of chunks.

In other words, the present approach can be considered as a method which only performs, or continues to perform, a cryptographic operation once side-channel mitigation measures have been put in place. The approach does this through the TEE issuing a command to control a characteristic of a core of the processor on which the TEE is to be executed on upon subsequent invocation. In some examples, this command is issued to the REE, for example, as a scheduling request. In some examples, the scheduling request is issued to a REE global scheduler which is operable to schedule REE and TEE threads on one or more cores of the processor. This characteristic can, for example, cause the TEE to be executed in a state which is challenging to perform a side-channel attack on, for example, executing the TEE on a high-performance core, or, for example, executing the TEE on a core above a certain minimum clock frequency. This can enhance security as it is more challenging to accurately measure physical parameters such as electromagnetic emissions or power consumption of a core which is performing a greater number of operations per second. Additionally, or alternatively, the issued commands can be used to verify that the REE is respecting the commands of the TEE. This can enhance security, by verifying that the REE is not simply ignoring commands of the TEE which may be indicative of a compromised REE.

Subsequent to issuing of the command, the present approach verifies, upon subsequent invocation of the TEE, that the commanded characteristic of the core executing the TEE is indeed in accordance with the command. In some examples, the TEE will only perform the cryptographic operation on one or more chunks of the cryptographic operation responsive to a positive verification. Therefore, the present approach ensures that, at least a subset, of the cryptographic operation is performed under conditions which mitigate side-channel attacks thereby enhancing security.

Viewed from one perspective, there is provided a computer program for controlling a device to perform any of the above-described methods. In some examples, the computer program is stored on a storage medium.

Viewed from one perspective, there is provided a device comprising: a processor operable to execute a rich execution environment (REE) and a trusted execution environment (TEE); data storage storing at least one computer program for controlling the processing circuitry to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

Figure 1:
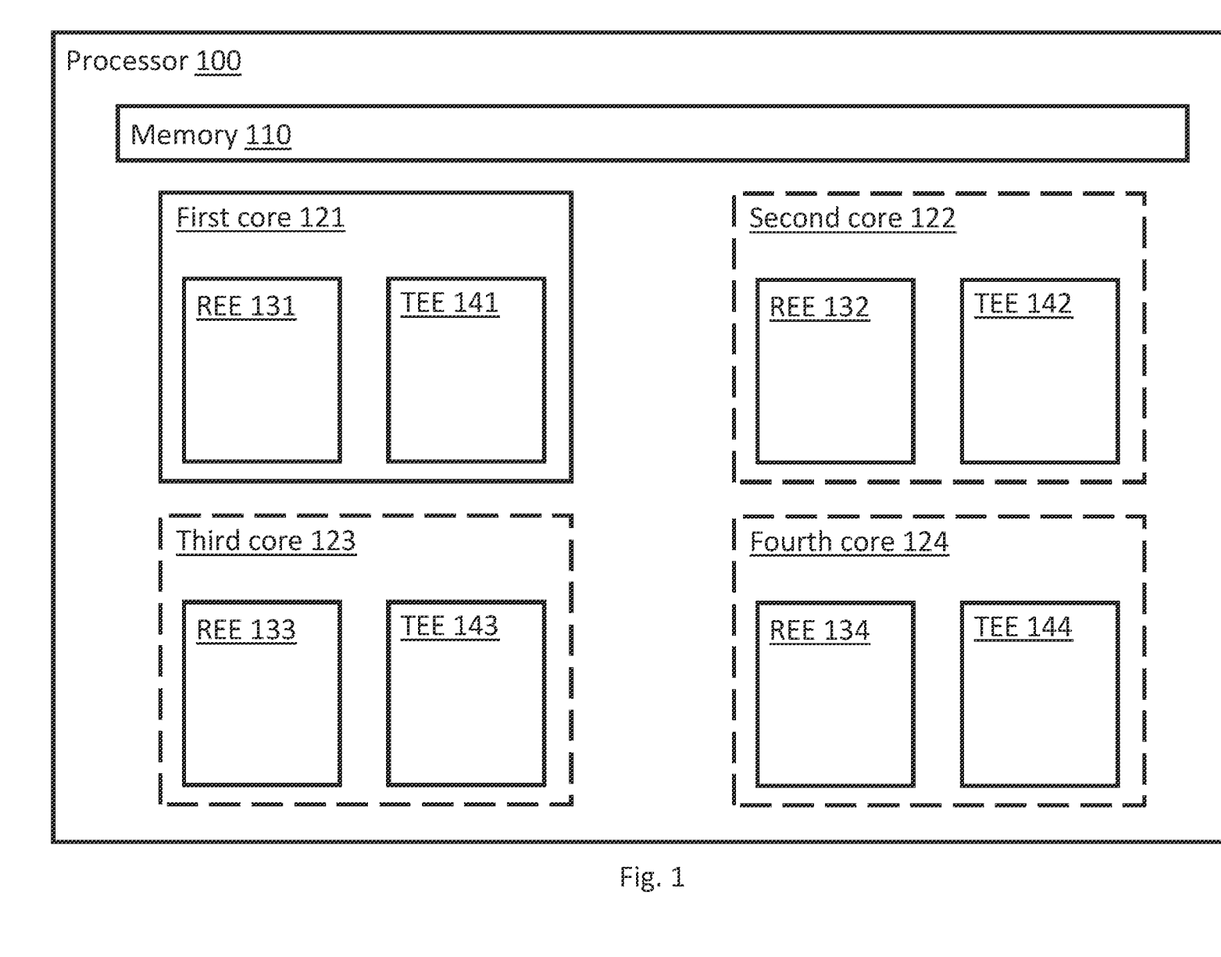
FIG. 1: Schematically illustrates a processor configured to operate according to teachings of the disclosure.

FIG. 1 shows a schematic illustration of a processor and data storage configured to operate according to teachings of the disclosure. Processor 100 is depicted as comprising four cores: a first core 121, a second core 122, a third core 123 and a fourth core 124. Each of the second core 122, the third core 123 and the fourth core 124 have been depicted with a dashed outline to show that these are optional and it will be understood that the teachings apply to both single and multicore processors except where otherwise indicated. While for clarity the figures have been depicted with only four cores it will be understood that the teachings contained herein also apply to multicore processors with any plurality of cores. In some examples, the processor 100 may have any of 2, 3, 4, 5, 6, 7, 8, 9, 10, 11, 13, 14, 15 or 16 cores. In some examples, all cores have similar performance characteristics to each other. In other examples, the processor 100 is a heterogeneous multicore processor where at least one of the cores of the heterogeneous multicore processor has different performance characteristics to another of the cores of the heterogeneous multicore processor. For example, the processor 100 may have a first plurality of cores which are power-hungry but have relatively high computational performance and a second plurality of cores which are power efficient and have a relatively low computational performance. An example of a heterogeneous multicore processor architecture which can implement the present techniques is Arm® big.LITTLE™. Another example of such a suitable architecture is Arm® DynamIQ™.

As can be seen the processor includes a shared memory location 110 which is accessible to at least certain threads (e.g. those with elevated privilege levels such as the kernel) in both the REE and TEE. While the shared memory location 110 has been depicted as part of processor 100 it is understood that in some examples the shared memory location 110 may wholly, or in part, reside in static RAM, dynamic RAM, secondary storage or any other memory location accessible to the processor 100.

As can be seen, each of the first core 121, a second core 122, a third core 123 and a fourth core 124 have a normal area (REE 131, REE 132, REE 133 and REE 134 respectively) and a secure area (TEE 141, TEE 142, TEE 143 and TEE 144 respectively). The REEs are operable to run Rich Execution Environment applications, services and other threads. In some examples, typically as part of the boot procedure, a REE global scheduler is provisioned in at least one of the REE 131, 132, 133, 134. In some examples, the REE global scheduler schedules threads, including the TEE. In further examples, the REE global scheduler acts to maintain a particular power consumption and/or temperature and/or performance profile of the processor cores. The TEEs are operable to run Trusted Execution Environment applications, services and other threads. From one perspective, TEE 141, TEE 142, TEE 143 and TEE 144 can be considered, for example, as TEE execution contexts of a single TEE. Further, in some examples, a TEE scheduler is provisioned in at least one of the TEE 141, 142, 143, 144 either as part of the boot procedure of the device or upon invocation of one or more of the TEE 141, 142, 143, 144.

Figure 2:
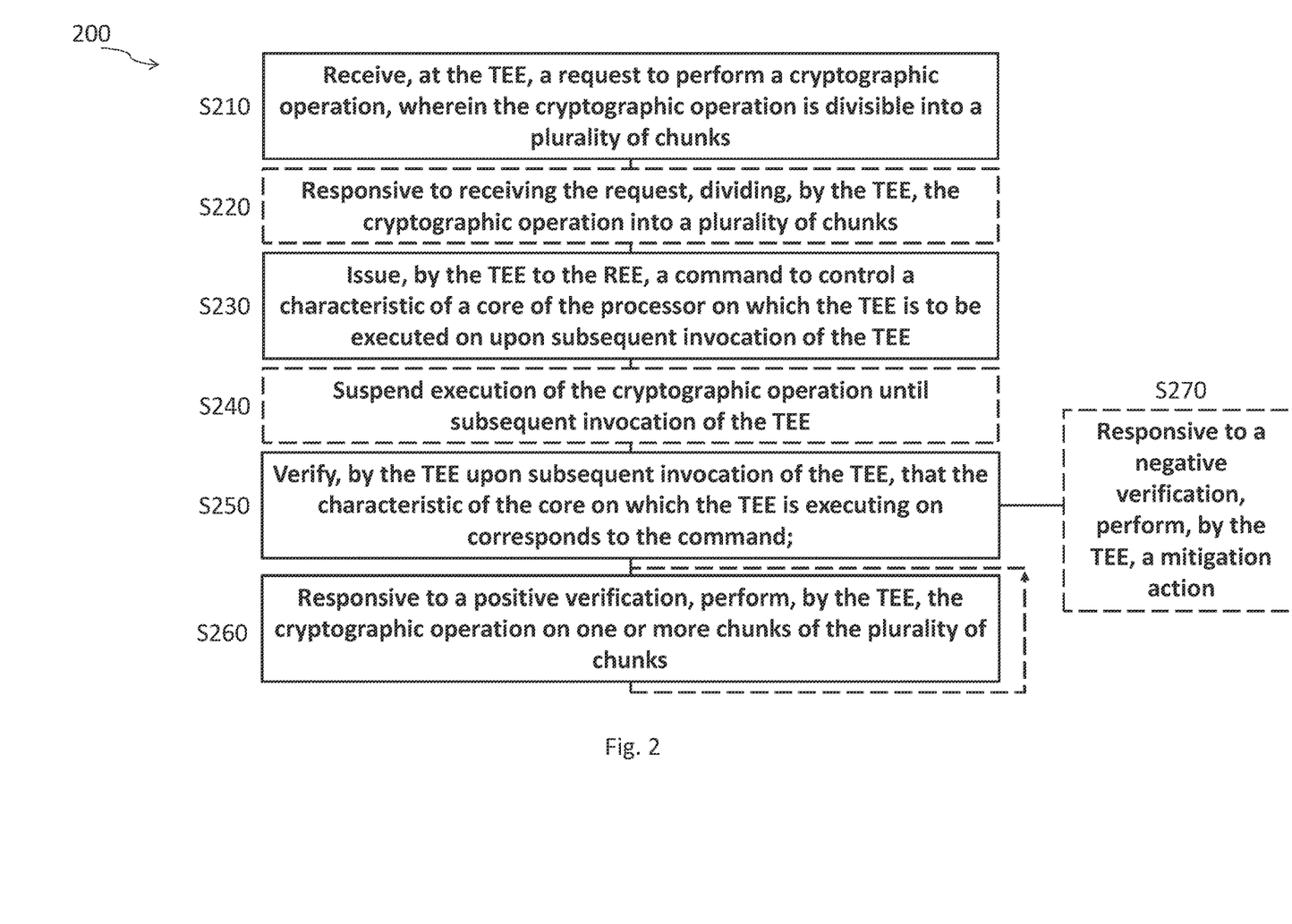
FIG. 2: Schematically illustrates a method for protecting a cryptographic operation from side-channel-attack according to teachings of the disclosure.

FIG. 2 shows a schematic illustration of a method 200 for protecting a cryptographic operation from side-channel-attack according to teachings of the disclosure. It will be understood that the method can be performed by the processor of the type depicted in FIG. 1. Examples of side-channel attacks include monitoring the power consumption and/or electromagnetic emissions of the processor executing the TEE. A malicious party can use the power consumption and/or electromagnetic emissions to infer information on the internal state of the processor which can, for example after a large number of repetitions of the cryptographic operation, allow the malicious party to infer the values utilised (e.g. a cryptographic key) in the cryptographic operations hence compromising its security. It will be appreciated that the above are just examples of side-channel attacks and that the present techniques provide protection against a broad range of different side-channel attacks. The method includes the following steps.

At step S210, a request is received at the TEE to perform a cryptographic operation, the cryptographic operation being divisible into a plurality of chunks. In some examples, the request can be received from an application, service or other thread running in the REE, or from an application, service or other thread running in the TEE, or from a different computing device external to the device. In some examples, the cryptographic operation comprises one or more of AES, DES, EEC and RSA. In the present example the method then continues to step S230.

At step S230, a command is issued by the TEE to control a characteristic of a core of the processor on which the TEE is to be executed on upon subsequent invocation of the TEE. In some examples, the command controls the characteristic just for the next invocation of the TEE thereby minimising disruption of the device's usual characteristic setting procedures (e.g. its processor thread scheduling routines) thereby allowing the device to operate in a computationally efficient manner. In other examples, the command controls the characteristic until a new command is issued or the cryptographic operation is complete. Thereby the security of the full cryptographic operation can be ensured.

In some examples, the processor is a multicore processor and the command instructs that the TEE is to be executed on a specific core of the multicore processor upon subsequent execution of the TEE. Thereby security can be enhanced as malicious parties conducting side-channel attack may attempt to force the TEE to operate on a single specified core to simplify analysis and so shifting core can enhance security. In some examples, the instructed core is chosen at random which can enhance security by making the choice of core unpredictable. In other examples, where the multicore processor is a heterogeneous multicore processor comprising one or more lower performance cores and one or more higher performance cores, the specific core is chosen to be one of the one or more higher performance cores. Thereby side-channel attacks are made more complicated as higher performance cores are more challenging to successfully analyse i.e. they have a more complex power consumption and electromagnetic emission signature. In further examples, the specific core is chosen at random from the one or more higher performance cores, thereby achieving the security of both random selection and from using a higher performance core. In some examples, a new command changing the instructed core can be issued on a periodic schedule. Thereby the side-channel attack is complicated by repeatedly changing the core which is executing the TEE. In other examples, a new command changing the instructed core can be executed after a random delay. Thereby the side-channel attack is complicated by repeatedly changing the core which is executing the TEE and furthermore the timing of the change is unpredictable thus further complicating the side-channel attack.

In some examples, the command instructs a clock frequency for the core on which the TEE is to be executed on upon subsequent invocation of the TEE. Thereby a further aspect of the core can be instructed which can be verified thus demonstrating that the issued commands have been respected thus maintain the security of the cryptographic operation in the TEE. In further examples, the clock frequency is a minimum clock frequency. Thereby, security is enhanced as side-channel attacks are made more complicated as higher frequency cores are more challenging to successfully analyse i.e. they have a more complex power consumption and electromagnetic emission signature. In some examples, the clock frequency or minimum clock frequency can be set to any of 100 MHz, 200 MHz, 300 MHz, 400 MHz, 500 MHz, 600 MHz, 700 MHz, 800 MHz, 900 MHz, 1 GHz, 1.25 GHz, 1.5 GHz, 1.75 GHz, 2 GHz, 3 GHz, 4 GHz, 5 GHz, 6 GHz, 7 GHz, 8 GHz, 9 GHz or 10 GHz.

In the present example the method then continues to step S250.

At step S250, upon subsequent invocation of the TEE, the TEE verifies that the characteristic of the core on which the TEE is executing on corresponds to the command. In some examples, the verification comprises directly obtaining processor core characteristic values, for example from device registers, and comparing these to the issued commands. Thereby a computationally efficient verification process is provided. In other examples, the verification process is indirect and involves testing the environment the TEE finds itself executing in, for example, through measurements of how long computations take to execute. Thereby, the security of the cryptographic operations is maintained even in the case where the device is compromised to the extent that it reports false processor core characteristic values to the TEE. In the present example, in the event of a positive verification, the method then continues to step S260.

At step S260, the TEE, in response to a positive verification that the characteristic of the core on which the TEE is executing on corresponds to the command, performs the cryptographic operation on one or more chunks of the plurality of chunks. In some examples, the cryptographic operation continues until the cryptographic operation has been performed on all of the (remaining) plurality of chunks thereby performing the cryptographic operation in a computationally efficient manner. In other examples, the cryptographic operation is only performed on a subset of the plurality of chunks thereby allowing for a second or subsequent command to be issued together with second or subsequent verification before performing the cryptographic operation on one or more further chunks thus further enhancing security. In some examples the one or more chunks are a predetermined number. In some examples after the cryptographic operation has been performed on the one or more chunks, one or more further issuing and verifying steps may be performed. Thereby the continued security of the cryptographic operation can be ensured. By varying the issued command from a first issuing step to a second issuing step, the security can be further enhanced by further complicating the analysis of a side-channel attack. Setting the predetermined number of the one or more chunks can allow for a trade-off between speed of processing the overall cryptographic operation on the one hand, and further enhancing the security of the cryptographic operation on the other.

In some examples, prior to step S230 and after step S210, the method performs step S220 where the TEE divides the cryptographic operation into a plurality of chunks. Thereby, the cryptographic operation is automatically processed into a form in which the method can be applied without the need for the request to provide a division of the cryptographic operation into a plurality of chunks. Further, by the TEE itself dividing the cryptographic operation into a plurality of chunks the nature and position of the divisions can be kept secret from entries outside the TEE thereby enhancing security. In other examples, the cryptographic operation can be provided to the TEE together with the request pre-divided into a plurality of chunks, or can be provided to the TEE together with the request with an indication of where the cryptographic operation may be divided. Thereby, computational resource in the TEE can be reduced.

In some examples, prior to step S250 and after step S230, the method performs step S240 where the execution of the cryptographic operation is suspended until subsequent invocation of the TEE. Thereby, the approach ensures that the cryptographic operation will not be executed (further) until a positive verification has been received that the commanded characteristics have been enacted and hence that a secure environment has been provided for the TEE to execute. In some examples, the specific application, service or thread that would be executing the cryptographic operation is suspended or terminated thereby ensuring security for the cryptographic operation without disrupting other applications, services or threads being executed by the TEE. In other examples, the whole TEE is suspended or terminated thereby providing security across all the applications, services and threads being executed by the TEE.

In some examples, in step S260 the TEE performs the cryptographic operation on two or more chunks responsive to a positive verification where the TEE iteratively performs the cryptographic operation on each chunk of the two or more chunks of the plurality of chunks. Thereby the chunks are processed in a manner that allows for the dependence of a cryptographic operation on a second chunk being dependent on the result of a cryptographic operation of a first chunk thereby allowing for more complex cryptographic calculations which can enhance security. In some examples, at each iteration a plurality of chunks are processed which can allow for computationally efficient processing of the chunks.

In some examples, in response to a negative verification in step S250, the method performs step S270 where responsive to the negative verification the TEE performs a mitigation action. Thereby the security of the approach can be maintained. In some examples, the mitigation action comprises preventing cryptographic operations from being performed hence protecting the security of the cryptographic operations when the verification has failed. In other examples, the mitigation action comprises terminating the TEE hence protecting the security of all applications, services and threads when the verification has failed. In further examples, the mitigation action comprises modifying the cryptographic operation to include errors in its output thereby confusing any analysis being performed by a malicious party attempting to perform a side-channel attack thus enhancing security. In addition, this approach wastes time and resources of the malicious party.

In some examples, from one perspective, the mitigation step acts to allow time for the device to enact the issued commands, for example, if the commands are not immediately enacted by the device but where the device is not compromised. Thereby the TEE can ensure the security of the cryptographic operations without unduly permanently preventing the cryptographic operation from being performed in the event of innocent delays. In some examples, a second verifying step, subsequent to a first verifying step is performed (discussed in further detail with respect to FIG. 3 below) which allows for a subsequent verification to be performed at a later point in time.

It will be appreciated that the steps of method 200 may be performed in a different order to that depicted in FIG. 2. As one example, step S220 can be performed at any point prior to step S260. As another example, step S230 could be performed prior to step S210 or step S220. It will also be appreciated that the method 200, or a sub-set of method 200, may be repeated multiple times. In the case where the whole method 200 is repeated this allows the TEE to perform multiple cryptographic operations in a series of requests. It will further be appreciated that steps S230 to S260 may be repeated multiple times. This can be performed, for example, to successively work through the full plurality of chunks and thereby perform the full cryptographic operation. In other words, in the first iteration of the loop the cryptographic operation can be performed on a first one or more chunks of the plurality of chunks, in the second iteration of the loop the cryptographic operation can be performed on a second one or more chunks of the plurality of chunks, and so on with the cryptographic operations being performed on further one or more chunks of the plurality of chunks until the full cryptographic operation is complete.

It will further be appreciated that in some examples, method 200 can be performed in conjunction with physical protection features of the device that act to further complicate side-channel attacks including electromagnetic shielding around the processor.

Figure 3:
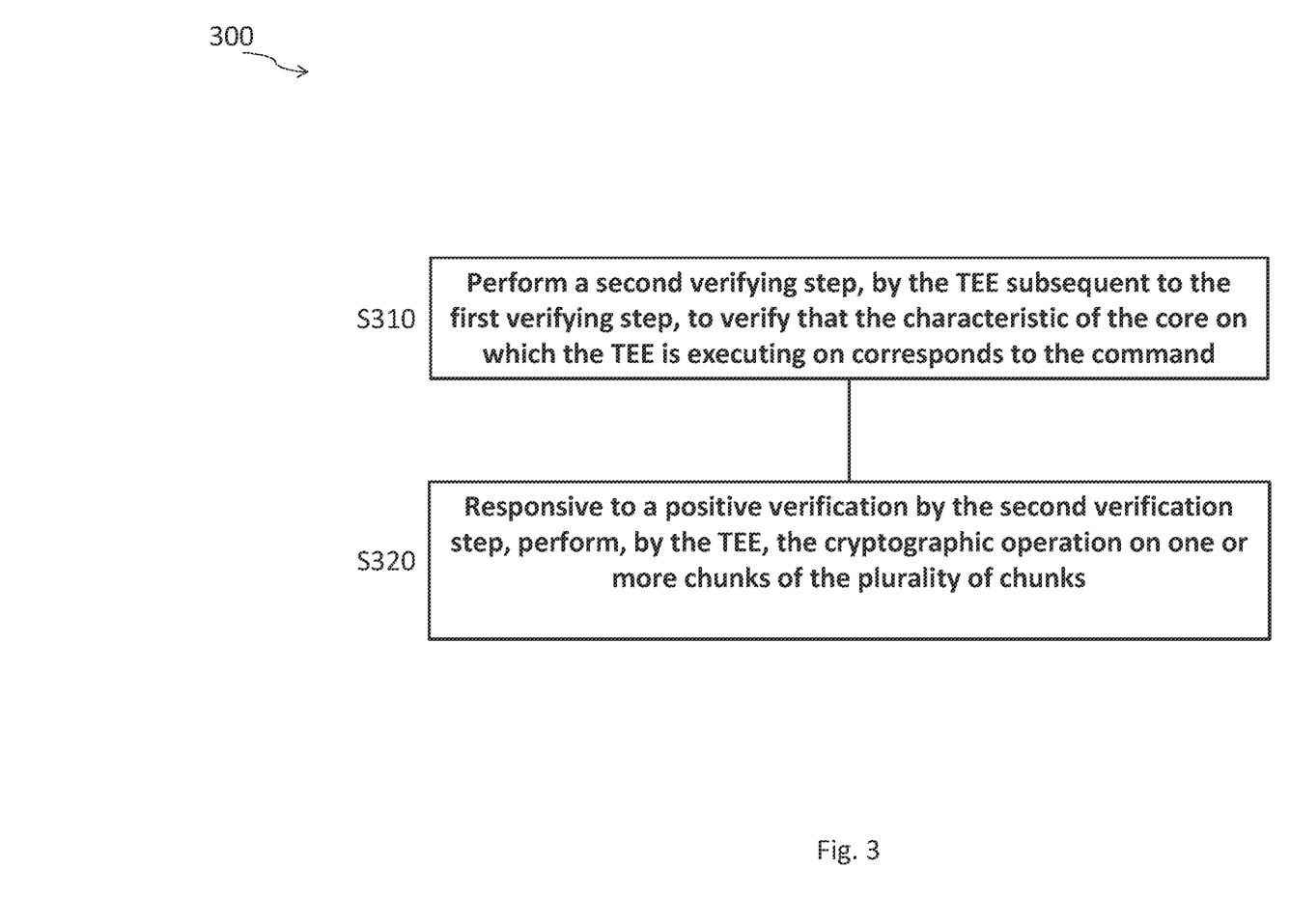
FIG. 3: Schematically illustrates a method for performing a second verification step and performing the cryptographic operation responsive to a positive verification at the second verification step.

FIG. 3 shows a schematic illustration of a method 300 for performing a second verification step and performing the cryptographic operation responsive to a positive verification at the second verification step. It will be understood that the method can be performed by the processor of the type depicted in FIG. 1. It will also be understood that method 300 can, in some examples, be performed after either of step S260 or step S270 depicted in FIG. 2. The method includes the following steps.

At step S310, the TEE performs a second verifying step, subsequent to the first verifying step, to verify that the characteristic of the core on which the TEE is executing on corresponds to an issued command (e.g. the command issued at step S230). The method then continues to step S320.

At step S320, the TEE, responsive to a positive verification by the second verification step, performs the cryptographic operations on one or more chunks of the plurality of chunks. Thereby the method allows for a second chance for the device to implement the issued command, for example in the event that there is a delay in implementing the command such that the first verification step resulted in a negative verification without compromising the security of the cryptographic operation. In some examples, the method may perform three or more verification steps. In other examples, the method may keep performing verification steps indefinitely, and in response to a positive verification, the TEE performs the cryptographic operations on one more chunks of the plurality of chunks. In some examples, the second verification step is performed even where the first verification step has resulted in positive verification. Thereby the method can ensure that the device remains in the commanded state when executing the TEE and thereby continues to provide a secure environment. In other words, the method can act to only allow the cryptographic operation to be performed when the most recent verification has resulted in a positive verification. In some examples, the predetermined number can be specified by the request such that the requesting entity can choose this trade-off.

Figure 4:
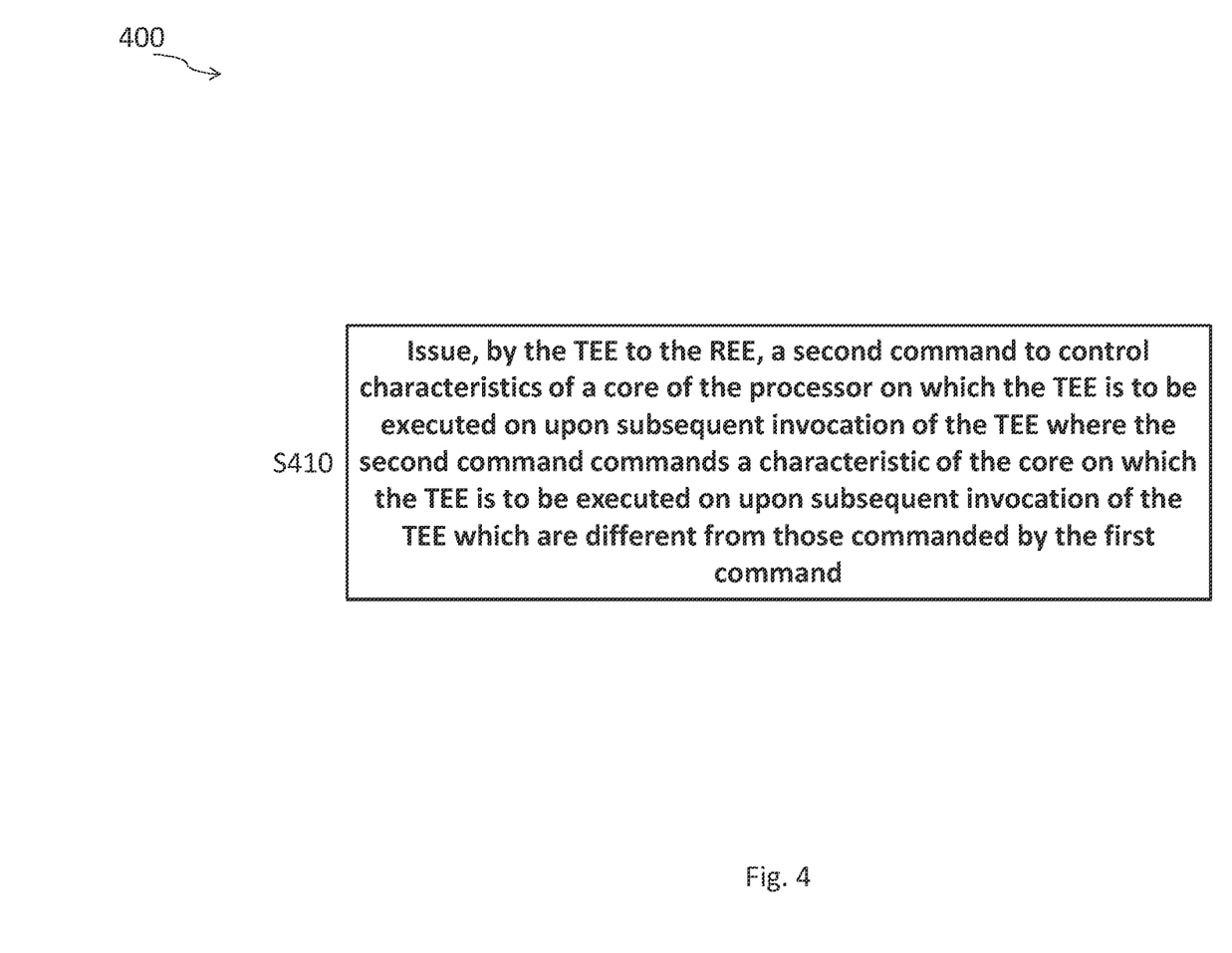
FIG. 4: Schematically illustrates a method for issuing a second command to control characteristics of a core of the processor on which the TEE is to be executed on upon subsequent invocation of the TEE.

FIG. 4 shows a schematic illustration of a method 400 for issuing a second command to control characteristics of a core of the processor on which the TEE is to be executed on upon subsequent invocation of the TEE. It will be understood that the method can be performed by the processor of the type depicted in FIG. 1. It will be understood that method 400, in some examples, can be performed at any point in the method 200 after Step S230. In addition, method 400, can be performed at any point before or after either of step S310 and step S320. It will be understood that any verification step after the issuance of the second command will verify the second command to control characteristics as opposed to the first command. The method includes the following step.

At step S410, the TEE issues, a second command to control characteristics of a core of the processor on which the TEE is to be executed on upon subsequent invocation of the TEE where the second command commands a characteristic of the core on which the TEE is to be executed on upon subsequent invocation of the TEE which are different from those commanded by the first command. Thereby, the command characteristics can be changed over time. This can enhance the security of the cryptographic operation as the variation in the commanded characteristic can further make it harder for the malicious party to extract the internal state of the TEE using a side-channel attack.

Figure 5:
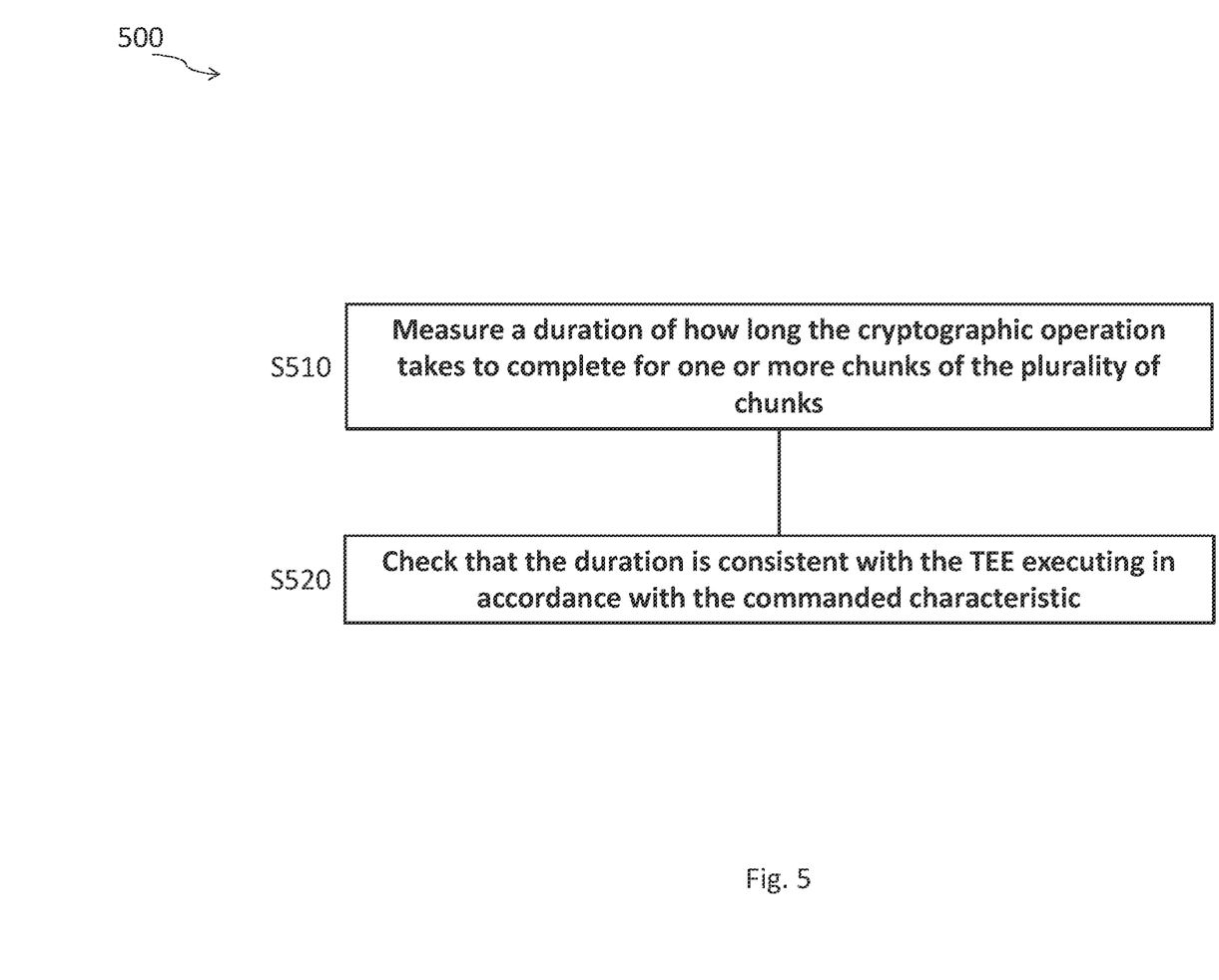
FIG. 5: Schematically illustrates a method for measuring the execution duration of a portion of a cryptographic operation and checking that this is consistent with commanded characteristics for executing the TEE.

FIG. 5 shows a schematic illustration of a method 500 for measuring the execution duration of a portion of a cryptographic operation and checking that this is consistent with commanded characteristics for executing the TEE. It will be understood that the method can be performed by the processor of the type depicted in FIG. 1. It will be understood that method 500 can be performed as part of a verification step, e.g. step S250 or step S310. The method includes the following steps:

At step S510, the TEE measures a duration of how long the cryptographic operation takes to complete for one or more chunks of the plurality of chunks. In some examples, duration is measured by using a trusted time source. Thereby a secure method of measuring duration is provided that is hard to fake. In other examples, the duration is measured using two or more secure interrupts. Thereby a secure method of measuring duration can be provided that leverages existing security infrastructure. In some examples, the duration of one or more dummy cryptographic operations is measured thereby preserving the security of the real cryptographic operations. In other examples, the duration of one or more chunks of the plurality of chunks of the real cryptographic operation is measured, thereby allowing for a computationally efficient way of measuring the duration. In yet further examples, rather than measuring how long a cryptographic operation takes to perform, the method can instead measure on how many chunks the cryptographic operation has been completed in a given time period. This can be performed, for example, by setting two interrupts at a known temporal separation and counting the number of chunks on which the cryptographic operation has been completed between these. Thereby a measure of performance, and hence characteristics of the core, on which the TEE is executed can be measured in a predetermined time period. The method then continues to step S520.

At step S520, the TEE checks that the duration is consistent with the TEE executing in accordance with the commanded characteristic. In some examples, consistency may be determined by having a performance which is within a certain tolerance of the expected value. Thereby, the TEE can directly test (i.e. as opposed to relying on core characteristics reported by the system or where the system is unable to report such core characteristics to the TEE) whether or not the commanded characteristics have actually been enacted thereby ensuring a secure execution environment for the TEE. In addition, where the duration is measured, it is made more challenging for a malicious party to bypass the core characteristic check, for example, by temporarily respecting the instructed core characteristic but then subsequently executing the TEE with core characteristics that make a side-channel attack easier i.e. initially execute the TEE on a high-performance and/or high-frequency core but after the core characteristic check has been performed execute the TEE on a low-performance and/or low-frequency core. In some examples, the TEE calculates how long the one or more chunks of the cryptographic operation is expected to take to complete for a given commanded characteristic. Thereby the expected duration can be calculated, for example, for any possible given command characteristic. In other examples, the TEE has access to a database of how long the one or more chunks of the cryptographic operation is expected to take to complete for a given commanded characteristic. Thereby, the computational expenditure of calculating the expected duration can be avoided. In some examples, steps S510 and steps S520 are repeated a plurality of times to verify the consistency of the commanded characteristics thereby enhancing security by detecting if a malicious party is repeatedly adjusting the characteristics of the core on which the TEE is executing to provide time-windows where it is easier to perform a side-channel attack.

Where the commanded characteristic comprises an instruction to execute the TEE on a specified core of a heterogeneous multi-core processor by measuring the duration the TEE could directly verify that it is being executed on a core of the type commanded e.g. a high-performance core. Where the commanded characteristic comprises an instruction to execute the TEE on a core at, or above, a specified clock frequency measuring the duration can directly verify that the performance of the core is consistent with the TEE being executed on the core at, or above the specified clock frequency.

Figure 6:
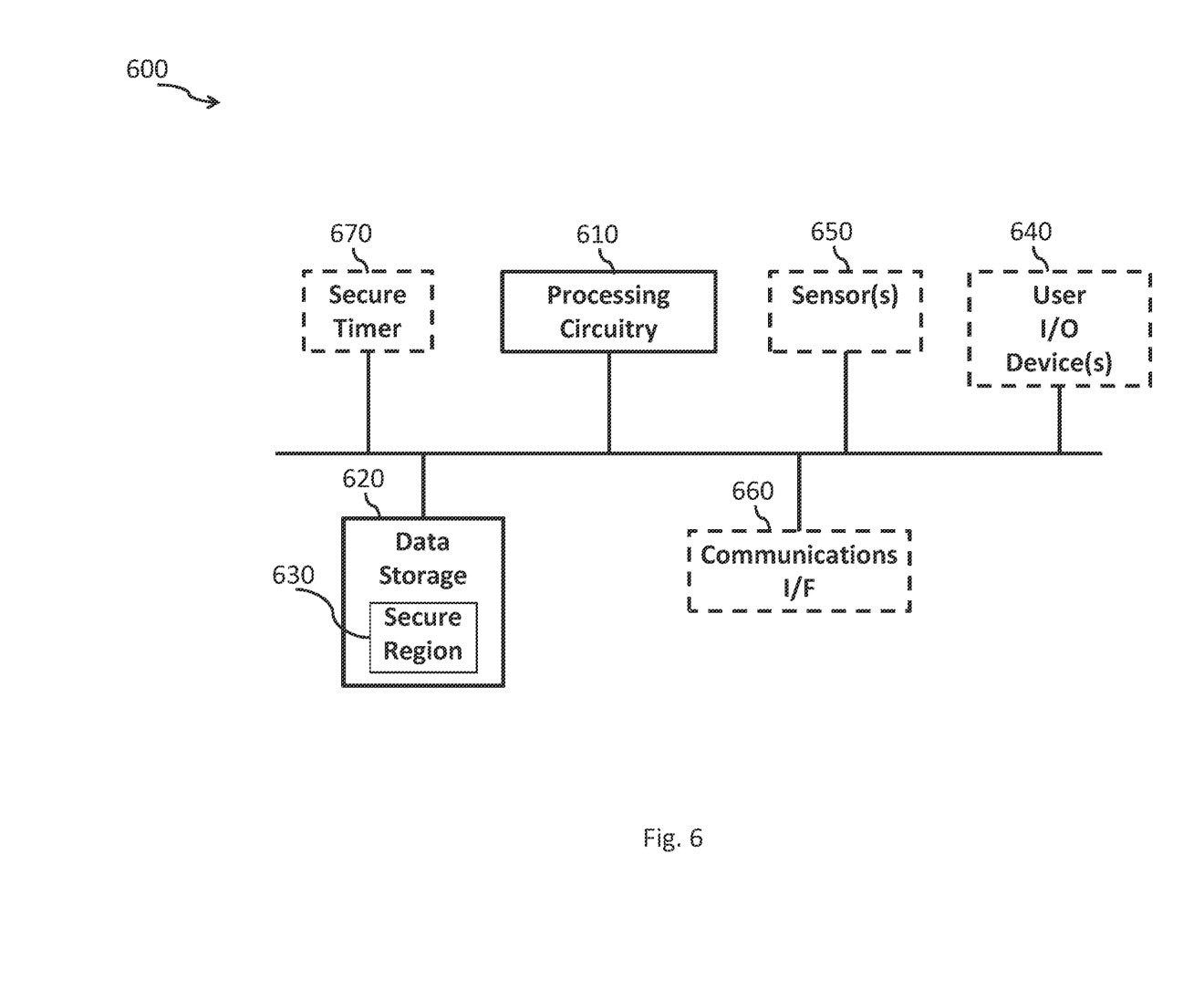
FIG. 6: Schematically illustrates an example of an electronic device which can be used to implement teachings of the disclosure.

FIG. 6 schematically illustrates an example of an electronic device 600 which can be used to implement any of the teachings described above including method 200, method 300, method 400 or method 500. The device has processing circuitry 610 for performing data processing in response to program instructions, data storage 620 for storing data and instructions to be processed by the processing circuitry 610. The processing circuitry 610 can correspond to the processor 100 described above. In some examples, the processing circuitry 610 includes one or more caches for caching recent data or instructions. The data storage 620 may have a secure region 630 which is protected by hardware mechanisms (e.g. using memory protection units or security mechanisms providing a TEE) or by software mechanisms (e.g. encryption), so that data stored in a secure region 630 is inaccessible to software not executing within a trusted environment. The device 600 may have a communications interface 660 for communicating with external devices. For example, communications interface 660 could use any other range of different communication protocols, such as Ethernet, WiFi®, Bluetooth®, ZigBee®, etc. The device may have one or more sensors 650 for sensing certain external conditions such as temperature, pressure, the proximity of a nearby user, etc. The specific sensors 650 provided may depend on the purpose of the device. For example, sensors 650 may include sensors which aid in biometric authentication such as a fingerprint sensor and a face recognition camera system. It will be appreciated that FIG. 6 is merely an example of possible hardware that may be provided in the device and other components may also be provided. For example, some devices for which user interaction is expected may be provided with one or more user input/output device(s) 640 to receive input from a user or to output information to a user. The device may have one or more secure timers 670 which can be used to provide a secure time source. The secure timer 670 may be part of the processing circuitry 610 or may be a dedicated hardware component. In some examples, one or more cores of processing circuitry 610 (e.g. of the type depicted in FIG. 1) may include a secure timer 670. In some examples, the secure timer 670 is configured to be accessible only to a TEE and not the REE. In further examples, where the secure timer 670 is part of a core of processing circuitry 610, the secure time 670 is configured to be accessible only to a TEE executing on that core and not to the REE or threads executing on other cores.

In some examples, the electronic device comprises one or more of: a car fob, a car ECU, an IoT device, a mobile phone, a tablet, a laptop, a desktop computer and a server. In some examples the cryptographic operation is being performed to protect one or more of: a financial transaction, a firmware update, a pay per view system, a locking mechanism or other security critical function.

The methods discussed above may be performed under control of a computer program executing on a device. Hence a computer program may comprise instructions for controlling a device to perform any of the methods discussed above. The program can be stored on a storage medium. The storage medium may be a non-transitory recording medium or a transitory signal medium.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

The invention claimed is:

1. A method for protecting a cryptographic operation on a device from a side-channel attack, the device comprising a processor including processing circuitry configured to execute a rich execution environment (REE) and a trusted execution environment (TEE), the method comprising:
   receiving, at the TEE, a request to perform a cryptographic operation, wherein the cryptographic operation is divisible into a plurality of chunks;
   issuing, by the TEE, a command to control a characteristic of a core of the processor on which the TEE is to be executed on upon subsequent invocation of the TEE;
   verifying, by the TEE upon subsequent invocation of the TEE, that the characteristic of the core on which the TEE is executing on corresponds to the command; and
   responsive to a positive verification, performing, by the TEE, the cryptographic operation on one or more chunks of the plurality of chunks,
   wherein the command instructs a clock frequency for the core on which the TEE is to be executed on upon subsequent invocation of the TEE, and
   wherein the verification comprises measuring a duration of how long the cryptographic operation takes to complete for one or more chunks of the plurality of chunks and checking that the duration is consistent with the TEE executing at the clock frequency.

2. The method of claim 1, wherein upon receipt of the request the TEE divides the cryptographic operation into the plurality of chunks.

3. The method of claim 1, wherein the one or more chunks comprise two or more chunks and wherein responsive to a positive verification the cryptographic operation is iteratively performed on each chunk of the two or more chunks of the plurality of chunks.

4. The method of claim 1, wherein the one or more chunks are a predetermined number of chunks.

5. The method of claim 1, wherein subsequent to issuing the command, the TEE suspends execution of the cryptographic operation until subsequent invocation of the TEE.

6. The method of claim 1, wherein the processor is a multicore processor and wherein the command instructs that the TEE is to be executed on a specific core of the multicore processor upon subsequent execution of the TEE.

7. The method of claim 6, wherein the specific core is chosen at random.

8. The method of claim 6, wherein the multicore processor is a heterogeneous multicore processor comprising one or more lower performance cores and one or more higher performance cores and wherein the specific core is chosen to be one of the one or more higher performance cores.

9. The method of claim 8, wherein the verification comprises measuring a duration of how long the cryptographic operation takes to complete for one or more chunks of the plurality of chunks and checking that the duration is consistent with the TEE executing on a higher performance core.

10. The method of claim 9, wherein the duration is measured using a trusted time source.

11. The method of claim 9, wherein the duration is measured by the TEE scheduling two secure interrupts at a temporal separation corresponding to the duration length.

12. The method of claim 1, wherein the clock frequency is a minimum clock frequency.

13. The method of claim 1, further comprising, responsive to a negative verification, preventing cryptographic operations from being performed, and/or terminating the TEE.

14. The method of claim 1, wherein the verifying step is a first verifying step, the method further comprising:
   a second verifying step, the second verifying step being performed by the TEE subsequent to the first verifying step and verifying that the characteristic of the core on which the TEE is executing on corresponds to the command; and
   responsive to positive verification by the second verification step, performing, by the TEE, the cryptographic operation on one or more chunks of the plurality of chunks.

15. The method of claim 1, further comprising, responsive to a negative verification, modifying the cryptographic operation to include errors in its output.

16. The method of claim 1, wherein the issuing step is a first issuing step and the command is a first command, the method further comprising:
   a second issuing step, the second issuing step being performed subsequent to the first issuing step and issuing a second command, wherein the second command commands a characteristic of the core on which the TEE is to be executed on upon subsequent invocation of the TEE which are different from those commanded by the first command.

17. A non-transitory, computer-readable storage medium storing a computer program for controlling an electronic device to perform the method of claim 1.

18. A device comprising:
   a processor including processing circuitry configured to execute a rich execution environment (REE) and a trusted execution environment (TEE);

data storage storing at least one computer program that when executed by the processor controls the processor to protect a cryptographic operation on the device from a side-channel attack by;

receiving, at the TEE, a request to perform a cryptographic operation, wherein the cryptographic operation is divisible into a plurality of chunks;

issuing, by the TEE, a command to control a characteristic of a core of the processor on which the TEE is to be executed on upon subsequent invocation of the TEE;

verifying, by the TEE upon subsequent invocation of the TEE, that the characteristic of the core on which the TEE is executing on corresponds to the command; and responsive to a positive verification, performing, by the TEE, the cryptographic operation on one or more chunks of the plurality of chunks, wherein the command instructs a clock frequency for the core on which the TEE is to be executed on upon subsequent invocation of the TEE, and wherein the verification comprises measuring a duration of how long the cryptographic operation takes to complete for one or more chunks of the plurality of chunks and checking that the duration is consistent with the TEE executing at the clock frequency.

* * * * *